United States Patent [19]

Carreno et al.

[11] Patent Number: 4,796,465

[45] Date of Patent: Jan. 10, 1989

[54] METHOD AND APPARATUS FOR MONITORING TURBOMACHINE MATERIAL

[75] Inventors: Diether E. Carreno; Peter J. Morgan, both of Schenectady, N.Y.

[73] Assignee: General Electric Company, Schenectady, N.Y.

[21] Appl. No.: 43,578

[22] Filed: Apr. 28, 1987

[51] Int. Cl.$^4$ .............................................. G01M 15/00

[52] U.S. Cl. ........................................ 73/116; 415/118

[58] Field of Search ......................... 73/116, 119 R, 86; 415/118; 416/144, 61

[56] References Cited

U.S. PATENT DOCUMENTS

| | | | |
|---|---|---|---|
| 3,736,811 | 6/1973 | Neary | 74/573 |
| 4,179,920 | 12/1979 | Schuller et al. | 73/86 |
| 4,631,961 | 12/1986 | Yohe et al. | 73/86 |
| 4,692,701 | 9/1987 | Dundas et al. | 73/801 |

FOREIGN PATENT DOCUMENTS

| | | | |
|---|---|---|---|
| 0060611 | 5/1980 | Japan | 415/118 |

*Primary Examiner*—Stewart J. Levy
*Assistant Examiner*—Robert R. Raevis
*Attorney, Agent, or Firm*—Jerome C. Squillaro

[57] ABSTRACT

Large turbomachines such as steam turbines and gas turbines will have an operational lifetime which may be measured in terms of decades. During the operational lifetimes it is desirable to monitor the condition of major parts of the turbomachine such as rotors and rotor wheels. Procedures are available for non-destructive testing of major turbomachine parts but it is desirable to affirm the actual condition of a turbomachine rotor by a sacrificial test of a speciment taken from a forging from which the actural turbomachine part was made. Further, it is desirable that the specimen be in service with the turbomachine part so as to obtain an accurate operating experience. To this end, a specimen taken from a turbomachine forging is affixed to a finished turbomachine part and then run with the machine for latter removal and test.

10 Claims, 3 Drawing Sheets

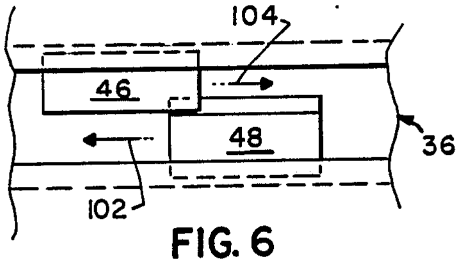
FIG. 6
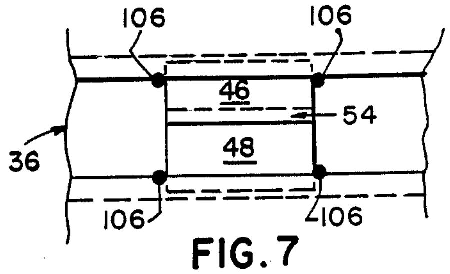
FIG. 7
FIG. 8a
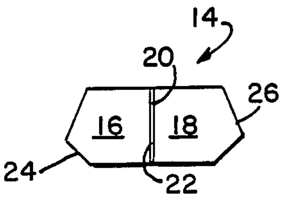
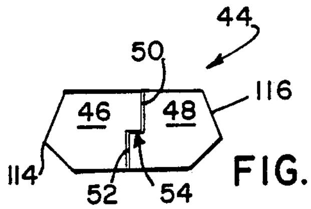
FIG. 8b
FIG. 8c
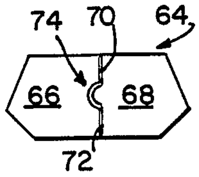
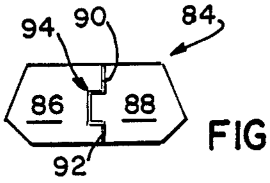
FIG. 8d

METHOD AND APPARATUS FOR MONITORING TURBOMACHINE MATERIAL

BACKGROUND OF THE INVENTION

This invention relates to turbomachines, in general; and, in particular to a method and apparatus for testing portions of a turbomachine material after the turbomachine has been in service for a predetermined interval of time.

In recent years, turbomachines such as gas turbines have been developed to provide increased output at higher firing temperatures. This increased duty requirement has promoted the use of high temperature alloys in large rotor forgings. The expected life of a turbomachine rotor may extend over periods in excess of twenty-five years during which time properties in such rotor material can be expected to degrade which could impair the availability of the turbine rotor for cyclic duty. The ability of a gas turbine to track load demand and therefore be subject to multiple start-ups and shutdowns (cyclic duty) is a distinct advantage of a gas turbine. It is important therefore to be able to confirm the actual condition of a turbomachine part such as a turbine rotor over various times during the operating life of the turbomachine.

Concern over material degradation over time is an important factor in the specification of turbine rotor alloys. This concern has led to the choice of more exotic alloys at a substantially increased cost in order to assure the continued reliability of the rotor material. If there were a way to inspect a rotor so that the actual condition of a forging material could be tested without destroying the turbomachine part, then a substantial saving in the choice of rotor material as well as a better informed decision regarding its continued operation could be made. In addition, exotic alloys are difficult to forge in large sizes and machining is difficult due to the material's high strength.

OBJECTS AND SUMMARY OF THE INVENTION

It is, therefore, an object of the invention to find a method and apparatus for sacrificially testing a specimen from a turbomachine part which was part of the original forging and operated under identical conditions as an actual turbomachine part.

It is another object of the invention to provide a method and apparatus for sacrificially testing a turbomachine part which was part of the original forging and operated under identical conditions as an actual turbomachine part without destroying the actual turbomachine part.

It is further an object of the invention to provide a method and apparatus for testing a specimen from a turbomachine rotor without having to remove or otherwise disassemble the rotor from the turbomachine.

It is yet another object of the invention to provide a method and apparatus for testing specimen from a turbomachine rotor without having to remove material from the rotor which could cause localized stresses.

In accordance with the foregoing objects of the invention, specimens are taken from a rotor wheel forging or other turbomachine forging and set aside. Thereafter, the part is formed for assembly in the turbomachine. A receptacle is formed as part of the turbomachine part whereupon the specimen previously taken from the forging is inserted into the receptacle to be run with the turbomachine part. As part of the invention, a receptacle for holding the specimens is disclosed as well as a balanced system for mounting the specimens onto the turbomachine part; and, finally arrangements for the specimen itself are shown so that it may be secured into the turbomachine part along with an assembly method.

The novel features believed characteristic of the present invention are set forth in the appended claims. The invention itself, however, together with further objects and advantages thereof, may best be understood with reference to the following description taken in connection with the drawings.

FIG. **5*a*** is a cross section of an annular groove showing the mounting of a first one of two test specimens into a receptacle annular groove.

Figure 5A:
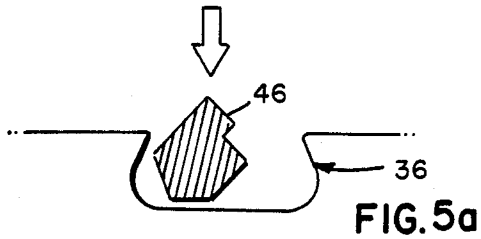

FIG. **5*b* shows two test specimens completely mounted into the annular groove shown in FIG. 5*a*.**

FIG. 6 is a plan view of the annular groove showing the specimens as they are first mounted into the annular groove.

FIG. 7 is a plan view of the annular groove showing the specimens after they have been fixed in place in the annular groove.

FIG. **8*a*** is an end view of two test specimens assembled with abutting vertical faces.

FIG. **8*b*** is an end view of two test specimens assembled with a stepped abutment.

FIG. **8*c*** is an end view of two test specimens assembled with a beaded joint.

FIG. **8*d*** is an end view of two test specimens assembled with a tongue and groove joint.

DETAILED DESCRIPTION OF THE INVENTION

Figure 1:
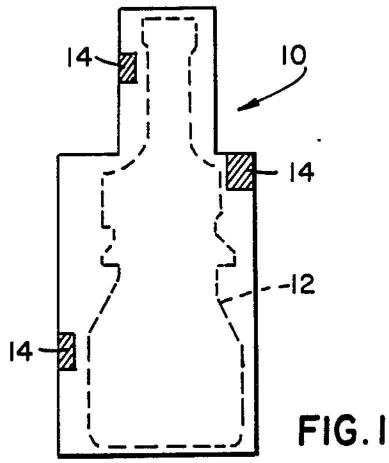
FIG. 1 is an elevation view of a wheel forging for a turbomachine with cross-sectional parts illustrative of specimens to be removed.
Figure 2:
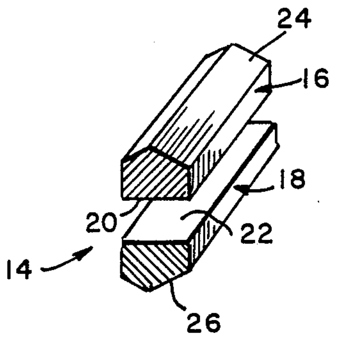
FIG. 2 is an isometric view of a specimen.

Referring to FIG. 1, and in accordance with the present invention, a forging 10 is shown with an outline of a turbomachine part 12 shown in phantom. The forging may be made of M152 wheel alloy material which is known to the steel industry as a 12 chrome steel alloy. However, this invention is also applicable to other turbine rotor alloys such as nickel base steel alloys. In accordance with the invention, a plurality of specimens 14 are removed from the rotor forging prior to the machining process which will form the turbomachine part as shown in the phantom outline. As is shown in FIG. 2, the test specimens are each taken in the form of mating halves 16 and 18 for ease and security of assembly to the turbomachine part. Each of the mating halves has a face portion 20 and 22 for mating halves 16 and 18 where the respective halves abut one another. Opposite the respective face portions 20 and 22 are inclined surfaces 24 and 26 which act to retain the test specimens in the turbomachine part in a manner yet to be explained.

Figure 3:
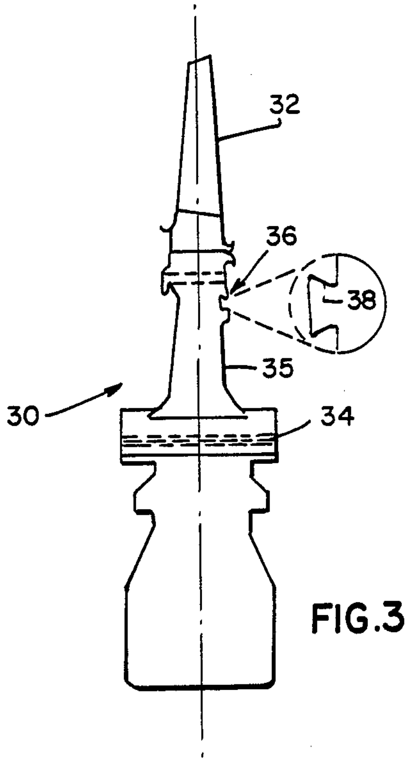
FIG. 3 is an elevation view of a turbine wheel and bucket with a magnified portion showing a cross-section of a receptacle for a specimen.
Figure 4:
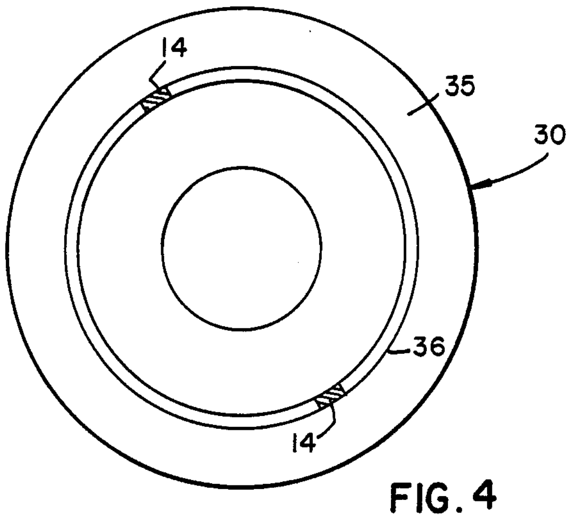
FIG. 4 is an elevation view of a turbine wheel looking in the axial direction showing the mounting relationship between a pair of specimens.

In FIG. 3, the machined turbomachine part is a rotor wheel or disk 30 to which may be mounted to a turbine bucket 32. Approximately midway along the radial height of the rotor disk, there is an annular bolt ring 34 whereby the rotor disk may be bolted to other rotor disks for forming a turbine rotor. A receptacle 36 is formed in the face 35 of the wheel disk and preferably is an annular groove having a rounded dovetail cross-section 38 as shown in the enlarged projection in FIG. 3. Referring to FIG. 4, the annular groove 36 is shown on the face of turbine disk 30 with a pair of specimens 14 mounted in the receptacle or groove. According to the preferred embodiment of the present invention, the specimens are mounted approximately 180 degrees apart for purposes of maintaining wheel balance for the turbine wheel. Therefore in accordance with the apparatus of the present invention, a turbomachine part 12 is formed from a block forging 10 as well as certain test specimens 14. The turbomachine part may, for example be a wheel disk 30 which is formed with a receptacle 36 such as an annular groove having a rounded dovetail cross section 38.

Skipping now to FIGS. 8*a*, 8*b*, 8*c*, and 8*d*, four examples of a test specimen are shown. In FIG. 8(*a*), the test specimen 14 is as previously described relative to FIG. 2 including the two halves having respective flat abutting faces 20 and 22, and outside inclined surfaces 24 and 26. In FIG. 8(*b*), an alternative test specimen 44 is shown wherein there are two specimen halves 46 and 48 having abutting flat faces 50 and 52 with a stepped abutment 54. The stepped abutment 54 renders the two specimen halves as interlocked relative to one another for purposes of assembly and security within the receptacle. In FIG. 8(*c*), a test specimen 64 includes two specimen halves 66 and 68 having two abutting flat faces 70 and 72 within a beaded joint 74. Finally, another embodiment in FIG. 8(*d*) shows a test specimen 84, with a pair of specimen halves 86 and 88, having abutting flat faces 90 and 92 with a tongue and groove joint 94. Again, the purpose of the interruptions 54, 74 and 94 in the respective abutting flat faces 50, 52; 70, 72; and, 90, 92; is for assembly and security.

Figure 5B:
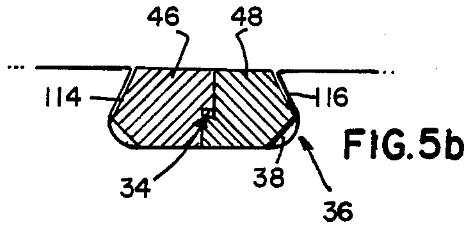

Referring to FIGS. 5, 6, and 7; the method of assembling test specimens into the receptacle on the turbomachinery part includes dividing each test specimen into two specimen pieces. In accordance with FIG. 5(*a*), one specimen piece 46 is inserted into the receptacle annular groove 36 whereas the other specimen piece 48 is inserted into the annular groove or receptacle 36 at some circumferential distance apart to enable both specimen pieces to be moved toward one another as shown in FIG. 7 arrows 102 and 104. When the stepped portion overlaps or when the two specimen pieces are coincident, the specimens are fixed by means of weldments 106 or other known means so that the test specimen is fixed to a specific circumferential location in the annular groove as is shown in FIG. 7. Figure 5(*b*) shows the relationship between the two specimen pieces taken at an end view of the groove 36. From that view, it is clear that the outside inclined faces 114 and 116 for pieces 46 and 48 respectively interact with the dovetail cross-section 38 of the groove 36 to retain and otherwise secure the two pieces within the groove.

In the method according to the present invention, and referring to FIG. 1, a forging is provided from which a turbomachine part is to be manufactured. Prior to machining or otherwise forming the turbomachine part from the forging; specimens are taken from the forging preferably from several different locations in order to obtain the widest possible range of forging material. After the turbomachine part is manufactured from the forging the specimens are attached to the turbomachine part so that the specimens participate in the same turbomachine environment as the turbomachine part. After a period of operation which may be measured in years or tens of thousands of hours the specimen is removed from the turbomachine part and may be sacrificially tested in order to determine the true condition of the turbomachine part made from the same forging.

Further, in accordance with the method of the invention, the step of attaching the specimens to the turbomachine part includes forming a receptacle on the turbomachine part and inserting a specimen in the receptacle. In a preferred embodiment, the turbine part is a wheel disk and the receptacle is an annular groove in the face of the wheel disk either on the upstream or downstream side. Because the receptacle is an annular groove, the specimens may be placed at any circumferential distance from one another but preferably if there are two such specimens then, for purposes of maintaining balance the specimens should be at a circumferential distance of 180 degrees apart.

The specimen taken from the forging may be subject to a shaping step wherein the specimen is divided into two complementary pieces including flat abutting surfaces and outside inclined surfaces. The outside inclined surfaces interact with the dovetail groove to retain the specimen in the annular groove while the abutting surfaces of the complementary pieces may be formed with either a step, a bead or a tongue and groove to provide an interlocking joint between the two specimen pieces. The attaching step would therefore further include the steps of inserting one specimen piece into the groove and then manipulating the other specimen piece so that it mates with the first specimen piece.

The testing and monitoring part of the invention may be any known test which may be applied to a metallurgical sample. Conveniently, the invention does not require the actual deletion of a portion of a turbomachine part but rather on the removal of a specimen from the turbomachine part. Moreover and in accordance with the present invention the testing may be a sacrificial test; ie; the specimen may be destroyed for microscopic evaluation and other testing procedures known in the metallurgical arts. In this respect, the monitoring step will be accomplished through the testing procedure since it will be at that time that decisions regarding the future operation of the turbine part may be made.

While there has been shown what is considered to be the preferred embodiment of the invention other modifications and arrangements may become apparent to those having skill in the art. It is intended to cover in the appended claims all such modifications and arrangements which will fall within the true spirit and scope of the following claims. For example, while this invention has been described primarily with reference to a gas turbine it is equally applicable to a steam turbine.

What is claimed is:

1. A method for monitoring the material in a rotor wheel of a turbomachine comprising the steps of:

providing a forging for the rotor wheel;

taking at least one specimen from the forging;

forming the rotor wheel from the forging;

forming a receptacle on the rotor wheel wherein the receptacle is an annular groove on a face of the rotor wheel;

inserting at least one specimen into the receptacle; and, removing the specimen, for testing, from the receptacle after operation of the turbomachine.

2. The method recited in claim 1 wherein the taking step further comprises:

removing several specimens from the forging at different locations on the forging.

3. The method recited in claim 1 wherein the inserting step further comprises:

fastening the specimen in the receptacle to prevent movement of the specimen.

4. The method recited in claim 1 wherein the taking step comprises:

removing at least one specimen from the forging;

shaping the specimen for insertion into the receptacle.

5. The method recited in claim 4 wherein the shaping step comprises:

dividing the specimen into two complementary pieces; and, wherein the inserting step further comprises:

inserting one specimen piece into the receptacle; and manipulating the other specimen piece into the receptacle so that it abuts with the one specimen piece.

6. A turbomachine rotor wheel comprising:

the rotor wheel having opposite faces and made from a block forging;

a receptacle comprising an annular groove formed in at least one face of the rotor wheel;

at least one test specimen taken from the same block forging as the rotor wheel inserted into the annular groove whereby the test specimen may be removed and tested apart from the rotor wheel without destroying the rotor wheel.

7. The rotor wheel recited in claim 6 wherein the annular groove has a dovetail cross section.

8. The rotor wheel recited in claim 6 wherein there are two specimens disposed in the annular groove at about 180 degrees apart.

9. The rotor wheel recited in claim 6 wherein the specimen is comprised of two specimen pieces mounted in the annular groove and abutted with one another.

10. The rotor wheel recited in claim 6 wherein the specimen is comprised of two specimen pieces mounted in the annular groove and interlocked with one another.

* * * * *